(12) United States Patent
Veksland et al.

(10) Patent No.: US 6,801,260 B1
(45) Date of Patent: Oct. 5, 2004

(54) AUTOMATIC FOCUSING CAMERA WITH MOVING MIRROR BETWEEN FIXED LENS AND FIXED IMAGE SENSOR

(75) Inventors: Michael L. Veksland, Marlton, NJ (US); Richard J. Skokowski, Jr., Warwick, PA (US)

(73) Assignee: Accu-Sort Systems, Inc., Telford, PA (US)

(*) Notice: Subject to any disclaimer, the term of this patent is extended or adjusted under 35 U.S.C. 154(b) by 0 days.

(21) Appl. No.: 09/503,817

(22) Filed: Feb. 15, 2000

(51) Int. Cl.[7] .................. G02B 13/16; H04N 5/225; H04N 5/232; G03B 13/00
(52) U.S. Cl. .................. 348/345; 348/335; 348/340; 348/374
(58) Field of Search .................. 348/335, 340, 348/344, 345, 351, 357, 369, 3.74; 396/89; 250/204

(56) References Cited

U.S. PATENT DOCUMENTS

| | | | |
|---|---|---|---|
| 3,912,922 A | 10/1975 | Lacotte et al. .............. 250/204 |
| 4,457,580 A | 7/1984 | Klose ........................ 350/6.91 |
| 4,667,255 A | 5/1987 | Lindberg ..................... 358/293 |
| 4,798,947 A | 1/1989 | Baxter ........................ 250/201 |
| 4,829,171 A | 5/1989 | Katsumura ................... 250/201 |
| 5,231,443 A | 7/1993 | Subbarao ..................... 354/400 |
| 5,442,167 A | 8/1995 | Cornelius et al. ........ 250/201.2 |
| 5,485,263 A | 1/1996 | Bjorner et al. ............. 356/4.01 |
| 5,610,730 A | 3/1997 | Osipchuk ..................... 358/494 |
| 5,717,512 A | 2/1998 | Chmielewski, Jr. et al. 359/210 |
| 5,909,302 A | 6/1999 | Guissin et al. .............. 359/225 |
| 6,130,993 A | * 10/2000 | Hayakawa .................... 396/55 |

* cited by examiner

Primary Examiner—Wendy R. Garber
Assistant Examiner—Justin Misleh
(74) Attorney, Agent, or Firm—Volpe and Koenig, P.C.

(57) ABSTRACT

An automatic focusing camera which includes an image sensor is provided having a fixed lens system with a lens having an object side and an image side. The fixed lens system is located in a fixed position relative to the image sensor. A mirror is moveably positioned between the image side of at least one lens and the image sensor. The mirror is located at an angle such that an image observed through the fixed lens system is reflected toward the image sensor. An actuator is connected to the mirror and moves the mirror relative to the lens system to change a distance between the lens system and the image sensor to adjust an object focal length between an object and the object side of the lens.

9 Claims, 2 Drawing Sheets

US 6,801,260 B1

AUTOMATIC FOCUSING CAMERA WITH MOVING MIRROR BETWEEN FIXED LENS AND FIXED IMAGE SENSOR

BACKGROUND OF THE INVENTION

The present invention is directed to an automatic focusing camera, and more particularly to an automatic focusing line scan camera for use in scanning applications.

In scanning applications, for examples for packages traveling along a conveyor, it is often required that scans be carried out at varying target distances. For example, if a larger package moves along a conveyor beneath a scanner, the distance between the lens of the scanning camera system and the object is shorter than for a smaller package traveling along the same conveyor path. Prior known systems generally provide focusing for the scanning camera by adjusting the position of the lens system or the image sensor to focus the image plane on the senor. However, this can result in higher costs for systems employing movement of one or more lens in order to maintain the optical alignment of the lens relative to one another and the sensor. Additionally, movement of the image sensor can add additional complexity and cost due to the need to provide electrical connections to an from the imaging sensor and to maintain the desired orientation of the sensor over the path of movement.

It would be desirable to be able to provide adjustment of the object focal length without the need for moving either the lens system (or one or more lenses therein) or the sensor relative to one another in order to provide a simple and reliable automatic focusing system for a camera system, preferably for use in scanning applications.

SUMMARY OF THE INVENTION

Briefly stated, the present invention is an automatic focusing camera which includes an image sensor. A fixed lens system is provided having a lens with an object side and an image side. The fixed lens system is located in a fixed position relative to the image sensor. A mirror is moveably positioned between the image side of the lens system and the image sensor. The mirror is located at an angle such that an image observed through the fixed lens system is reflected toward the image sensor. An actuator is connected to the mirror and moves the mirror relative to the lens system to change a distance between the lens system and the image sensor to adjust an object focal length between an object and the camera.

In another aspect, the present invention provides a method for automatic focusing of a camera having an image sensor and a lens system with an objective lens located at a fixed position relative to the image sensor. The method comprises: (a) providing a mirror moveably mounted between an image side of the lens system and the image sensor; and (b) adjusting the position of the mirror to vary a length of an optical path between the image sensor and the lens system to vary an object focal point on an object being observed.

BRIEF DESCRIPTION OF THE SEVERAL VIEWS OF THE DRAWINGS

The foregoing summary, as well as the following detailed description of the preferred embodiments of the invention will be better understood when read in conjunction with the appended drawings. For the purposes of illustrating the invention, there is shown in the drawings embodiments which are presently preferred. It should be understood, however, that the invention/is not limited to precise arrangements shown. In the drawings.

DETAILED DESCRIPTION OF THE INVENTION

Figure 2:
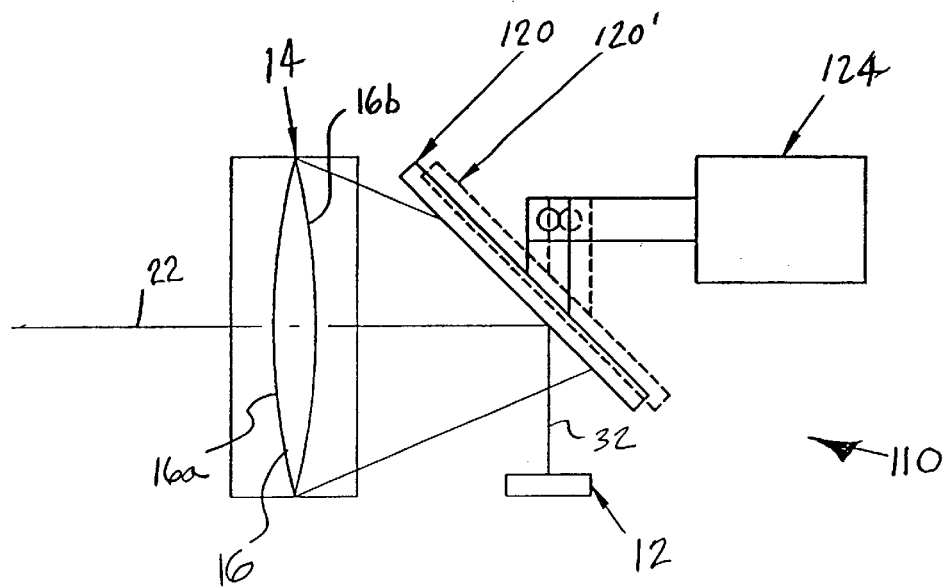
FIG. 2 is a plan view of a second embodiment of an automatic focusing camera in 1 accordance with the present invention.

Certain terminology is used in the following description for convenience only and is not considered limiting. The words "right", "left", "lower", and "upper" designate directions in the drawings to which reference is made. The terminology includes the words specifically noted above, derivatives thereof and words of similar import. Additionally, the terms "a" and "one" are defined as including one or more of a referenced item unless specifically noted.

Figure 1:
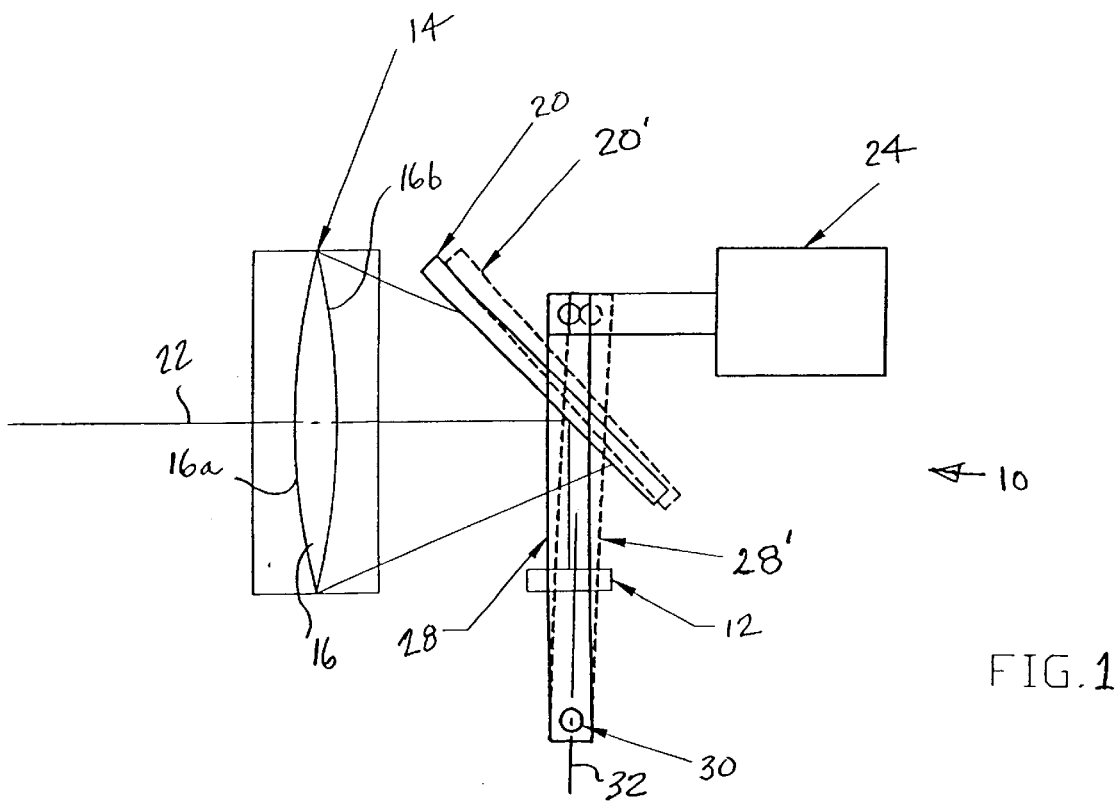
FIG. 1 is a plan view of the automatic focusing camera in accordance with the present invention.

Referring to the drawings, wherein like numerals designate like elements throughout, there is shown in FIG. 1 a preferred embodiment of an automatic focusing camera 10 in accordance with the present invention. Preferably, the automatic focusing camera 10 is a line scan camera and includes an image sensor 12 and a fixed lens system 14 having an objective lens 16 with an object side 16a and an image side 16b. The fixed lens system 14 is located in a fixed position relative to the image sensor 12, for example by fixed mounting of the image sensor 12 and the lens system 14 on a common substrate, for example a circuit board. The fixed lens system 14 has an optical axis 22. While the fixed lens system 14 is illustrated as including a single objective lens in the first preferred embodiment of the invention 10, it will be recognized by those skilled in the art from the present disclosure that the fixed lens system 14 may include multiple lenses, depending upon the particular application. However, in accordance with the present invention, it is contemplated that if multiple lens are provided, the lenses would be adjusted to a fixed, in-use position relative to the other lenses as well as the image sensor 12, and that the automatic focusing of the camera 10 would be carried out without further adjustment to the lens system 14.

Still with reference to FIG. 1, a mirror 20 is positioned between the image side 16b of the lens system 14 and the image sensor 12. The mirror 20 is located at an angle such that an image located along the optical axis 22 is observed through the fixed lens system 14 and is reflected toward the image sensor 12. This is illustrated most clearly by the path of the optical axis 22 of the lens system 14 which is reflected by the mirror 20 toward the image sensor 12 generally along a path 32 normal to the face of the image sensor 12.

An actuator 24 is connected to the mirror 20 that moves the mirror 20 relative to the lens system 14 to change a distance between the lens system 14 and the image sensor 12 to adjust an object focal length between an object (not shown in FIG. 1) and the camera 10. As shown in FIG. 1, preferably the mirror 20 is mounted on an arm 28 having a pivot point 30 located along an optical axis 32 of the image sensor 12. The actuator 24 is connected to the mirror 20 via the arm 28. Preferably, the pivot point 30 is located on an opposite side of the image sensor 12 from the mirror 20 and is offset sufficiently such that pivoting movement of the arm 28 approximates linear movement over the range of motion for the mirror 20.

In a preferred embodiment, the actuator 24 is a voice coil. However, those skilled in the art will understand from the present disclosure that the actuator 24 may be constructed as a solenoid or a stepper motor with a lead screw or using any other suitable controllable displacement means. In the first preferred embodiment, the pivot point 30 is formed by a pin connection. However, it will be recognized by those skilled in the art from the present disclosure that the pivot could be provided by a flexible member such as a leaf spring or a living hinge which would provide the additional advantage of biasing the arm 28 in a given direction to maintain greater stability of the mirror 20, if desired.

As shown in FIG. 1, when the actuator 24 is actuated, the arm 28 can be adjusted to a second position, shown in dashed lines as 28', moving the mirror 20 to a second position shown as 20' to adjust the length of the optical path between the lens system 14 and the image sensor 12. This causes the object focal point to vary in a predictable manner as explained in more detail below.

In the preferred embodiment, the focusing mechanism is used in conjunction with a line-scan camera system, such as a line-scan CCD camera as the image sensor 12. This is due to the fact that if the object plane and the nodal plane of the lens system 14 are parallel, then the image plane at the image sensor 12 must also be parallel to both the object and nodal planes in order for a complete image to be in focus. The pivoting of the mirror 20 in the first preferred embodiment causes the sensor plane to be non-parallel to the lens nodal plane resulting in an out-of-focus condition for all except a single line in the sensor plane across the face of the image sensor 12. However, as long the image sensor 12 is a single-line sensor located at this line of perfect focus, then the image sensor 12 will see the object without distortion. This is especially useful for scanning applications where a single scan line is generally being observed aid imaged by the camera 10.

Referring now to FIG. 2, a second preferred embodiment of the automatic focusing camera 110 is shown. The second preferred embodiment of the automatic focusing camera 110 is similar to the first embodiment 10 and like elements have been designated with the same reference numerals. The differences between the automatic focusing camera 110 of the second preferred embodiment of the invention and the automatic focusing camera 10 of the first embodiment of the invention are explained in detail below.

Figure 3:
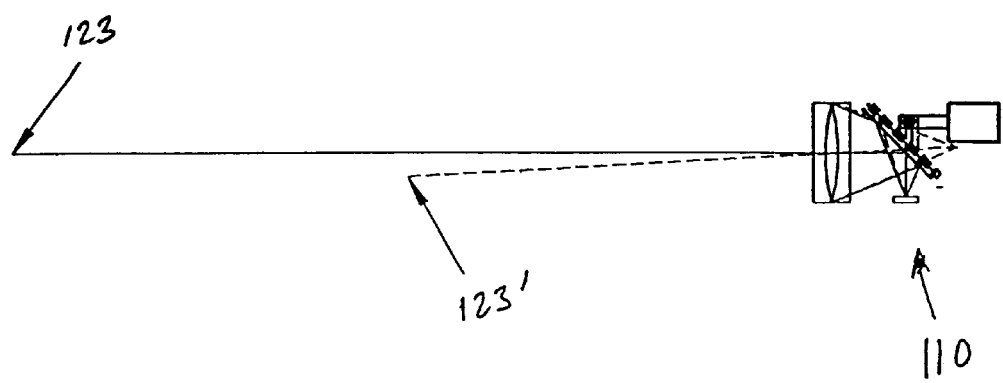
FIG. 3 is a plan view of the automatic focusing camera shown in FIG. 2 illustrating the shift in the object focal line as the object focal point moves farther from or nearer to the lens system.

In the second preferred embodiment of the invention, the automatic focusing camera 110 includes a mirror 120 which is mounted for generally linear movement parallel to the optical axis 22 of the lens system 14. Preferably, the mirror 120 is connected to a linear actuator 124 for movement of the mirror 120 from a first position to a second position 120', as shown by dashed lines in FIG. 2, to change the length of the optical path between the lens system 14 and the image sensor 12. In the second preferred embodiment of the automatic focusing camera 110, since the actuator 124 causes the mirror 120 to move linearly along a path generally parallel to the optical axis 22 of the lens system 14, the object, lens and sensor planes all remain parallel such that the image can be focused on the surface of the image sensor 12. However, the field of view of the image sensor 12 moves orthogonally to the sensor line as shown in FIG. 3. This results in a shift of the object focal line 123 up or down (for example to the position indicated by 123') as the focal point moves farther from or nearer to the lens system 14, respectively. As shown by comparing the first position of the lens 120 in FIG. 2 with the object focal line 123 in FIG. 3 versus the second position of the lens 120' in FIG. 2 and the second object focal line 123' in FIG. 3, this shift becomes apparent.

While in the second preferred embodiment a line-scan camera is also used as the image sensor 12, it is also possible to utilize a two dimensional image sensor 12 in connection with the second preferred embodiment since the object, lens and sensor planes all remain parallel to the field of view of the image sensor 12.

In use, the position of the mirrors 20, 120 of the automatic focusing cameras 10, 110 are adjusted to vary a length of an optical path between the imaging sensor 12 and the lens system 14 to vary an object focal point on an object being observed. In the first preferred embodiment, this is accomplished by moving the mirror about the pivot point 30, shown in FIG. 1, and receiving the image to be scanned on a single line-scan camera, such as a single line CCD camera. In the second preferred embodiment, the mirror 120 is moved linearly along a path parallel to an optical axis 22 of the lens system 14, as shown in FIG. 2, to adjust the position of the mirror 120 in order to focus the object image on the image sensor 12.

While the preferred embodiments of the invention have been described in detail, the invention is not limited to the specific embodiments described above which should be considered as merely exemplary. Further modifications and extensions of the present invention may be developed, and all such modifications are deemed to be within the scope and spirit of the present invention as defined by the appended claims and all legal equivalents thereto.

What is claimed is:

1. Automatic focusing camera comprising:
   an image sensor;
   a fixed lens system having a lens with an object side and an image side, the fixed lens system being located in a fixed position relative to the image sensor;
   a mirror movably positioned between the image side of the lens and the image sensor, the mirror being located at an angle such that an image observed through the fixed lens system is reflected toward the image sensor; and
   an actuator connected to the mirror that moves the mirror relative to the lens system to change a distance between the lens system and the image sensor to adjust an object focal length between an object and the camera.

2. The automatic focusing camera of claim 1, wherein the mirror is mounted on an arm having a pivot point located along an optical axis of the image sensor and the actuator is connected to the mirror via the arm.

3. The automatic focusing camera of claim 2, wherein the pivot point is located on an opposite side of the image sensor from the mirror.

4. The automatic focusing camera of claim 1, wherein the actuator is a voice coil.

5. The automatic focusing camera of claim 1, wherein the mirror is mounted for generally linear movement parallel to an optical axis of the lens system.

6. The automatic focusing camera of claim 1, wherein the sensor is a single line sensor.

7. Method for automatic focusing of a camera having an image sensor and a lens system with a lens located at a fixed position relative to the image sensor, comprising:
   providing a mirror movably mounted between an image side of the lens system and the image sensor; and
   adjusting the position of the mirror to vary a length of an optical path between the imaging sensor and the lens system to vary an object focal point on an object being observed.

8. Method for automatic focusing of claim 7, further comprising:
   moving the mirror linearly along a path parallel to an optical axis of the lens system to adjust the position of the mirror.

9. Method for automatic focusing of claim 7, further comprising:
   moving the mirror about a pivot point located along an optical axis of the image sensor; and
   receiving an image to be scanned as a single line in a plane of the image sensor.

* * * * *